US008660991B2

(12) United States Patent
Glaude

(10) Patent No.: US 8,660,991 B2
(45) Date of Patent: Feb. 25, 2014

(54) SYSTEMS AND METHODS FOR MANAGEMENT OF SUBSCRIBER DATABASES WITHIN MOBILE COMMUNICATIONS NETWORKS

(75) Inventor: Normand Glaude, Cumberland (CA)

(73) Assignee: Bridgewater Systems Corp., Ottawa (CA)

(*) Notice: Subject to any disclaimer, the term of this patent is extended or adjusted under 35 U.S.C. 154(b) by 161 days.

(21) Appl. No.: 13/185,096

(22) Filed: Jul. 18, 2011

(65) Prior Publication Data

US 2012/0179652 A1 Jul. 12, 2012

Related U.S. Application Data

(60) Provisional application No. 61/431,711, filed on Jan. 11, 2011.

(51) Int. Cl.
*G06F 7/00* (2006.01)
*G06F 17/00* (2006.01)
(52) U.S. Cl.
USPC ........... 707/652; 707/644; 707/640; 707/654; 707/694
(58) Field of Classification Search
None
See application file for complete search history.

(56) References Cited

U.S. PATENT DOCUMENTS

| 7,206,836 | B2* | 4/2007 | Dinker et al. | 709/224 |
| 7,246,140 | B2* | 7/2007 | Therrien et al. | 707/999.202 |
| 7,330,997 | B1* | 2/2008 | Odom | 714/6.23 |
| 7,870,089 | B1* | 1/2011 | Hall et al. | 707/694 |
| 8,149,716 | B2* | 4/2012 | Ramanathan et al. | 370/238 |
| 2003/0236874 | A1* | 12/2003 | Hotti | 709/224 |
| 2008/0222154 | A1* | 9/2008 | Harrington et al. | 707/10 |
| 2009/0276771 | A1* | 11/2009 | Nickolov et al. | 717/177 |

* cited by examiner

*Primary Examiner* — Jau-Shya Meng
*Assistant Examiner* — Thomas Meng
(74) *Attorney, Agent, or Firm* — Zilka-Kotab, PC

(57) ABSTRACT

Systems and methods system for managing data objects that support the personalization of mobile communications services are provided. The system includes one or more databases that contain subscriber data, such as usage, or state information related to the subscriber. For one or more of the databases within the system, a database federator and a distributed object repository having multiple nodes is provided. The nodes are used to store data objects and duplicate data objects. Data objects may be distributed to the nodes based on, a hashing algorithm. Additionally, graceful redundancy degradation of stored duplicate objects is provided. Further, time-based triggering of duplicate objects stored within separate nodes is provided.

15 Claims, 8 Drawing Sheets

SYSTEMS AND METHODS FOR MANAGEMENT OF SUBSCRIBER DATABASES WITHIN MOBILE COMMUNICATIONS NETWORKS

This application claims the benefit of U.S. Provisional Application No. 61/431,711, filed Jan. 11, 2011, which is incorporated herein in its entirety.

BACKGROUND OF THE INVENTION

1. Field of the Invention

The present invention relates generally to mobile communications networks, and specifically to databases supporting personalization of mobile communications services.

2. Background Art

The rapid and widespread success of mobile broadband services has sparked exponential growth in mobile communications services and mobile data traffic. This traffic boom is driven by the popularity of smartphones, electronic book readers, laptop data cards and the like that have stimulated a dramatic increase in the number of mobile subscribers and their use of advanced applications such as, for example, mobile Internet browsing, video services, gaming, and location-based services. As advanced applications have grown more common, the need and desire to personalize services to individual subscribers has also increased dramatically. The ability to personalize communications services requires the use of very large databases that dynamically track subscriber usage, store subscriber profiles, and monitor subscriber state or activities within one or more network.

Systems and methods to support the personalization of mobile services need to be able to support small and large networks, such as, for example handling more than 100 billion transactions in a single month for a large wireless service provider, and being able to scale from 5,000 to over 100 million subscribers. To personalize services, mobile subscriber databases often need to be accessed tens of thousands of times per second from the network domain to support network applications. Unfortunately, the performance of conventional database solutions supports only a few hundred queries per second on cost-effective conventional hardware. Thus, having applications directly interfaced with subscriber databases is problematic and limiting. Additionally, from an administration perspective, performing upgrades or recovery of administrative aspects of subscriber databases often requires the shutdown or further slowdown in the ability to access the databases to support network applications. Such a situation is undesirable as it may lead to dropped services or lost revenue resulting from service unavailability.

As a result the extensive growth of mobile broadband services are introducing extremely demanding requirements to the control plane databases. Specifically, transaction rates are increasing asymptotically requiring very demanding response times (milliseconds). Additionally, adding to the demands and complexity is the shift of transactions from read-mainly to almost equal read-write situations. Lastly, the extremely high availability of data is adding to the challenges of managing the data effectively.

Unfortunately, scalability by purely adding more systems is not a viable option from an economics and a complexity management perspective. Traditional database technologies such a SQL or LDAP, while providing dependable services and complex ways to organize and query the data are not addressing the emerging extreme performance growth requirements.

What is required is a hybrid architecture that leverages the strengths of the traditional DBs in the data administration domain, while delivering the extreme performance growth requirements in the network domain.

BRIEF SUMMARY OF THE INVENTION

The present invention provides a hybrid "admin-network" architecture, almost-real-time in-memory DB system, together with fast access with simply organized key-index integrated computing grids, that fronts the administrative back-ends. Thus, applications and data scale together in a smoothly scalable, distributed grid of "share-nothing" blades (or computers), where each blade contains both the application and the data that the applications require. To provide both availability and scalability the present invention manages multiple copies of the data in each blade.

Among other things, the invention provides novel techniques for policy-driven optimization methods to balance between availability of data and the redundancy of the data and efficient methods of managing the timers required for the above methods In an embodiment of the present invention, a system for managing data objects that support the personalization of mobile communications services is provided. The system includes one or more databases that contain subscriber data, such as, for example, profile, usage or state information related to the subscriber. For one or more of the databases within the system, a database federator and a distributed object repository having multiple nodes is provided. The nodes are used to store data objects and duplicate data objects. The nodes are separate and may be co-located or geographically distributed. Data objects may be distributed to the nodes based on, for example, a hashing algorithm.

In an additional embodiment, a method for graceful redundancy degradation of stored duplicate objects is provided, such that a target replication factor determines the number of duplicates stored for each object. In an embodiment, the method includes establishing one or more node utilization thresholds, determining that a node utilization threshold has been exceeded, reducing the target replication factor based on the utilization threshold that has been exceeded, and then applying the updated replication factor to received objects.

In another embodiment, a method for time-based triggering of duplicate objects stored within separate nodes is provided. The method includes storing an object and an associated time-based trigger in two or more nodes, such that one of the two or more nodes is identified as the primary node for the object. Upon expiry of the associated time-based trigger, the primary node for the object communicates a trigger notification to an application that the trigger has expired. In this situation, the non-primary nodes do not communicate a trigger notification until after the expiry of at least one grace period. Upon receipt of the trigger notification, the application communicates to the two or more nodes where the object is stored a trigger acknowledgment that the trigger has been received and applying business logic triggered by the trigger notification within the application.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
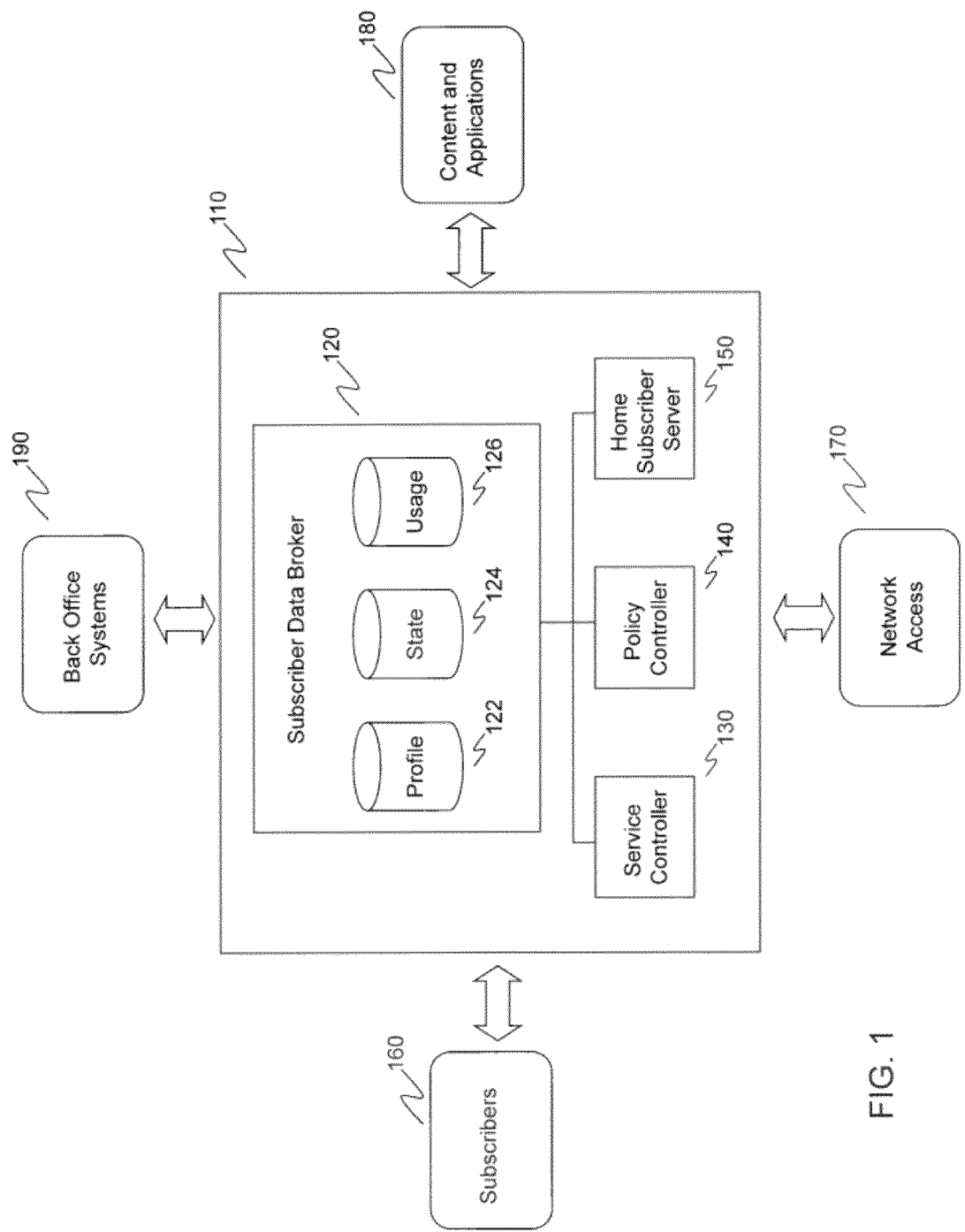
FIG. 1 provides a network diagram of a mobile personalization system, according to an embodiment of the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

FIG. 1 provides a network diagram of mobile personalization system 110, according to an embodiment of the invention. Mobile personalization system 110 provides mobile communications services personalization support for communications service provider networks, among others. Mobile personalization system 110 provides sophisticated data management that enables service providers to personalize the mobile communication experience in real time, and broker service provider subscriber data assets securely to third parties to capitalize on new business models and revenue sources.

Mobile personalization system 110 includes subscriber data broker 120, service controller 130, policy controller 140 and home subscriber server 150. Subscriber data broker 120 includes profile database 122, state database 124 and usage database 126. Mobile personalization system 110 includes interfaces to subscribers 160, network access 170, content and applications 180 and back office systems 190.

Mobile personalization system 110 has been adapted to support small and large networks, such as, for example handling more than 100 billion transactions in a single month for a large tier 1 service provider, and scaling from 5,000 to over 100 million subscribers. In embodiments, mobile personalization system 110 processes requests from network elements at a rate of 15,000 transactions per second, where each transaction may in turn generate more than one query to the databases. With the performance of conventional database solutions being in the range of a few hundred queries per second using cost-effective conventional hardware, achieving scalability and reliability properties required to support large providers of mobile services requires dozens of nodes and sub-elements to reach throughput requirements.

The present invention uses a distributed architecture, as highlighted in FIG. 4 below, to enable access and use of profile database 122, state database 124 and usage database 126. In order to support the extremely dynamic nature of these databases, while recognizing the critical need for reliability, the distributed architecture employs distributed timers for triggering events and graceful eviction of redundant data objects.

Subscriber data broker 120 features a mature data modeling capability that enables service providers to model subscribers and services across all applications and network types, bundle services and launch new applications quickly. Subscriber data broker 120 enables service providers to broker subscriber data assets securely to network decision and enforcement functions, application platforms, charging systems, as well as to third party content providers. Subscriber data broker 120 relies upon three databases providing different types of dynamic subscriber information. These are profile database 122, state database 124 and usage database 126.

Profile database 122 includes data objects providing reference information, as it contains subscriber information, policy data, and network topology data. Policy data (usage rules) is typically static, whereas subscriber information changes fairly frequently, depending on subscriber and policy churn. Network topology tables include information about the various elements in the network and how other network elements and services interact with them. Profile database 122 can get quite large, and may include information from a few hundred thousand to 10's of millions of subscribers, along with thousands of network elements. From an administrative perspective, profile database 122 is managed via GUIs (in user time) and via interfaces to external systems, and must offer near real-time performance (less than 250 ms response time) for provisioning purposes. From a network perspective, profile database 122 is consulted by the various network applications, and must offer real-time performance (less than 1 ms response time) to these applications in a read-only mode (with some occasional writes). It can also be consulted by $3^{rd}$ party applications via standardized or proprietary interfaces.

State database 124 includes state information that identifies and defines network sessions, which are tied to subscribers. State database 124 provides real-time subscriber awareness and context that is critical to effectively managing customer experiences and meeting increasingly high user expectations for service quality and delivery. State database 124 primarily includes transactional data, and contains mostly transient data. For example, session data is typically created and deleted when a subscriber starts and stops using a service (like placing a call, or watching a video), and may be modified throughout the session. State database 124 processes and supports real-time network events and is required to provide real-time performance (less than 1 ms response time) and high transaction volumes from thousands to ten thousand transactions per second, for example.

In embodiments, state database 124 includes information about the network, such as the IP address that the subscriber is currently using and what network the subscriber is currently connected to. Additionally, state database 124 includes device information, such as the device being used and the version of software, which enables multimedia applications to optimize the quality of the delivered content and services based on the device being used. State database 124 also includes information about the subscriber, including location, if the subscriber is roaming, and services being used or requested. Unique data information that is provided by the network, but not necessarily covered by industry standards may also be stored. This information can be used in many ways based on service-provider specific architectures. In embodiments, state database 124 includes any combination of the above state information.

Awareness of the current state of a subscriber is key to providing a variety of services. For example, knowledge of the IP address of the subscriber enables application and content-based billing. Knowledge of the access type enables access-specific multimedia content delivery (i.e., providing the right application, in the right format, on the right network.) Knowledge of the device type enables weather, locators, mapping and regional offer applications to the subscriber. Knowledge of the subscriber activity can be used to support parental controls, provide historical tracking and trending and trigger the offering of service upgrades. Finally, state information related to time of day, week or year supports seasonal offers, promotional offers, birthday offers, limited-time event offers, and the like.

Usage database 126 provides data required by operators to generate billing information, audit transactions and reconcile statements from operators. This transactional data is stored in usage database 126, which is processed in near real-time to generate a massaged and consolidated stream of usage information fed to third party billing systems.

Service controller 130 authenticates subscribers and enables them to access a network quickly. Service controller 130 includes a policy and profile engine that provides a scalable and robust platform for centralized subscriber services such as authentication, authorization and accounting, across all access types and infrastructures including 3G and 4G networks.

Policy controller 140 provides real-time network, application and subscriber policies that allow service providers to manage mobile data growth and deliver personalized services. Policy controller 140 includes multiple types of policies that work together to deliver a superior mobile experience. Network policies are performed by the Policy and Charging Rules Function (PCRF) in policy controller 130. These policies enable service providers to manage mobile data traffic by applying real-time bandwidth controls that adapt to changing network conditions and subscriber context. Policy controller 140 also supports application policies that enable service providers to rapidly provision new applications and apply policies to determine what, where, and under which circumstances subscribers can access applications.

Home subscriber server 150 provides a master repository that supports authentication, authorization and mobility management for GSM/UMTS, IMS, and 4G networks. It maintains information for the authentication, authorization and establishment of subscriber calls and sessions, featuring standards-based interfaces for core IMS or Evolved Packet Core (EPC) network elements.

Subscribers 160 include all types of customers using a wide range of devices. For example, subscribers 160 include residential, enterprise and retail subscribers that may use a wide range of mobile communication devices, such as, for example, cellular phones, smartphones, personal data assistants, laptop computers, electronic book devices, and tablet computers. Subscribers may also review to devices, such as smart electric meters. In emerging networks, automated devices, such as smart electric meters, for example, also interact with the network, create sessions and the like.

Network access 170 provides integrations between mobile personalization system 110 and network infrastructures of service providers. Networks may support a wide range of protocols, including, but not limited to 2G, 3G, and 4G wireless networks.

Content and applications 180 represents service and content providers that provide services, such as, for example, streaming media, SMS and social networking.

Back office systems 190 provides an interface to operation support systems for maintaining and supporting mobile personalization system 110.

Figure 2:
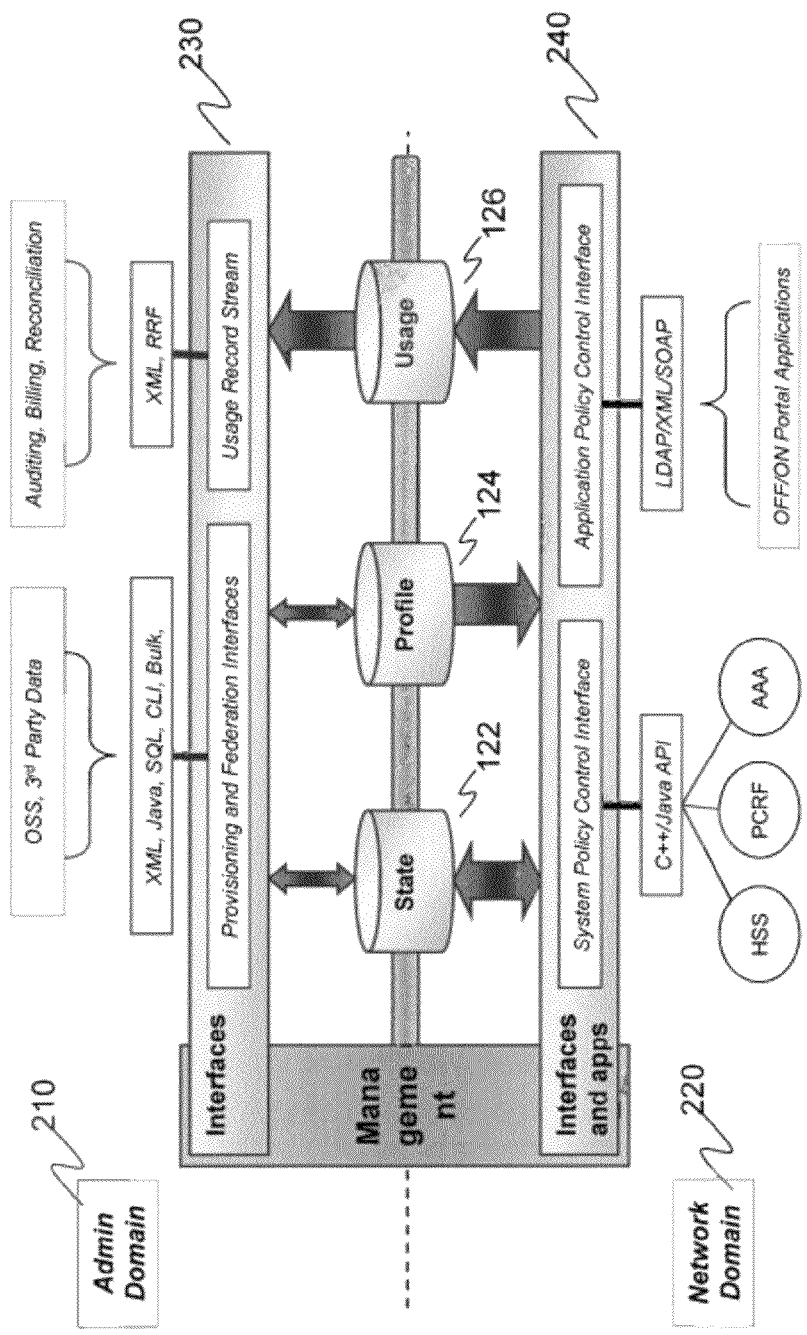
FIG. 2 provides a logical perspective of a subscriber data management architecture, according to an embodiment of the invention.

FIG. 2 provides a logical perspective of a subscriber data management architecture, according to an embodiment of the invention. FIG. 2 highlights the interfaces to state database 122, profile database 124 and usage database 126 from administrative domain 210 perspective and network domain perspective 220.

As shown in FIG. 2, state database 122 and profile database 124 have a two-way flow of data in administrative domain 210 in that they both exchange data from back office systems and $3^{rd}$ party data providers through a variety of interfaces supporting various protocols, such as, for example, XML, Java, SQL, CLI and bulk data. Usage database 126 provides data to the administration domain 210 to provide usage information for auditing and billing functions. On the network domain side, state database 122 exchanges information, while profile database 124 only provides information to network domain 220 and usage database 124 only receives information from the network domain 126. While the flow of data depicted in FIG. 2 is most common, in other embodiments, the flow of information between state database 122, profile database 124, and usage database 126 can include any combination of information flow between the administration domain 210 and network domain 210.

Spanning all axis of the system is a management function. The management function offers system management and administration, fault and alarm management, provisioning, and any other operational tools.

Figure 3:
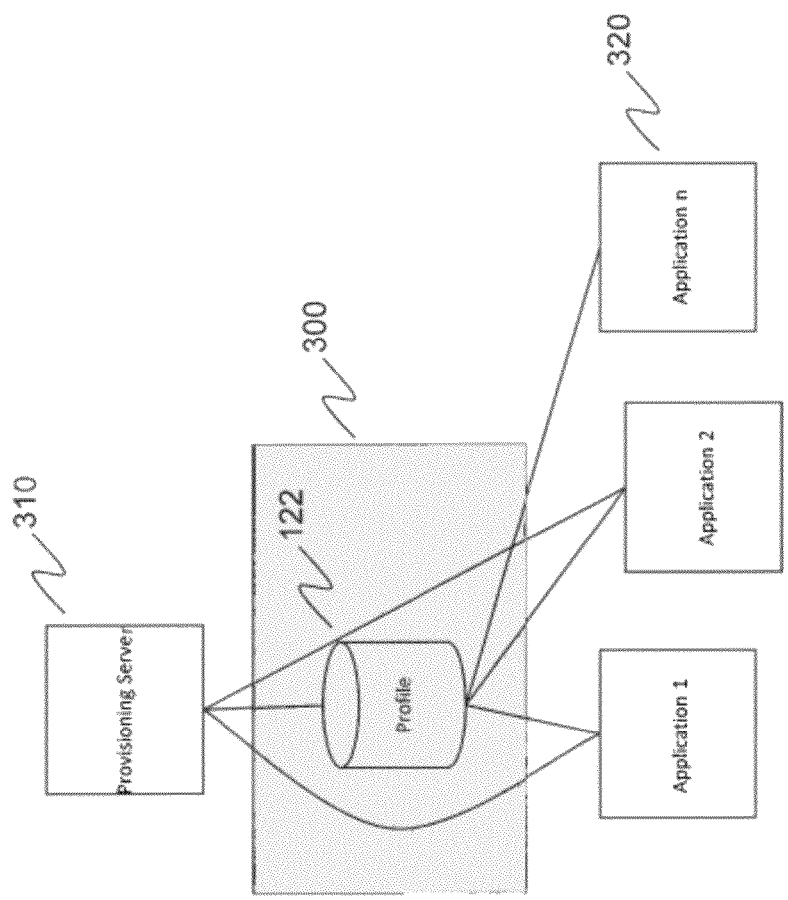
FIG. 3 provides a database architecture in which the administration and network domains are coupled.

FIG. 3 provides a database architecture 300 in which the administration and network domains are coupled. In architecture 300, provisioning server 310 (within the administration domain) is coupled to profile database 122, service controller 130, policy controller 140 and home subscriber server 150. Additionally, profile database 122 is coupled to service controller 130, policy controller 140 and home subscriber server 150 and, as such, applications interact directly with profile database 122. Given that the applications reside in the network domain, this requires profile database 122 to scale with the transactional rate of the network domain, which is problematic in large scale implementations.

Figure 4:
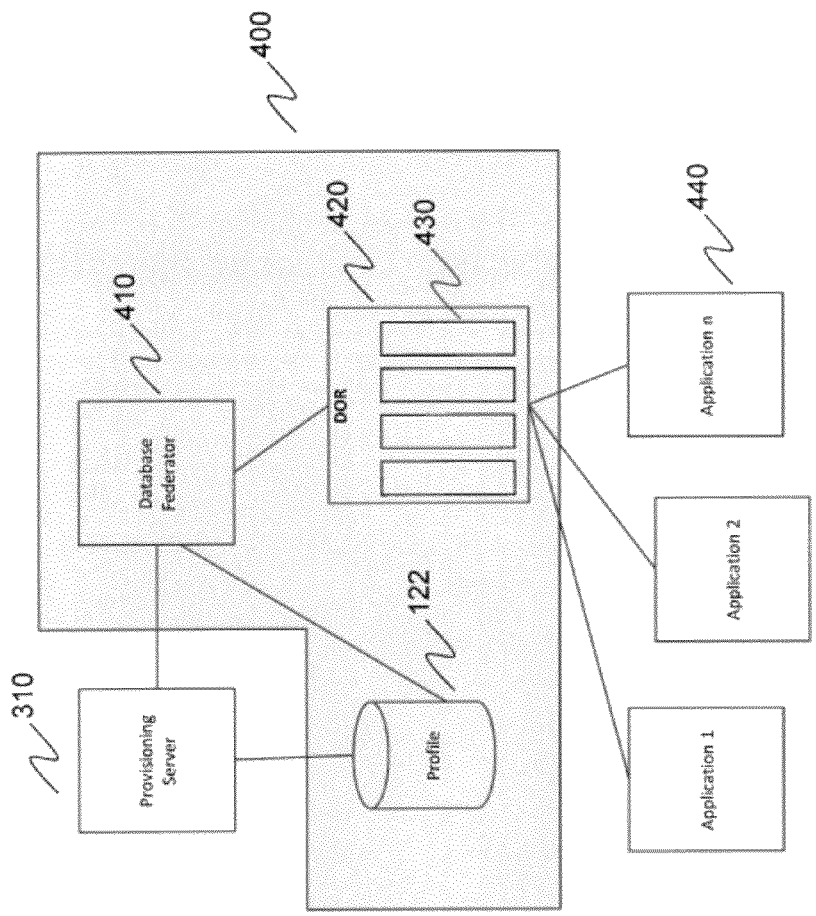
FIG. 4 provides database architecture in which the administration and network domains are decoupled, according to an embodiment of the invention.

FIG. 4 provides database architecture 400 in which the administration and network domains are decoupled, according to an embodiment of the invention. Database architecture 400 includes the elements of a distributed object repository 420 and database federator 410. Distributed object repository 420 functions as a consolidated data store for both profile and state data, and all of the objects are stored in memory in a distributed and redundant fashion across a cluster of nodes. The nodes may be collocated or located in separate geographical locations. Database federator 410 is a module whose responsibility is to synchronize profile database 122 with distributed object repository 420. This synchronization is bi-directional. It allows changes made to profile database 122 from the administrative domain to be propagated to the distributed object repository 420, and it also allows applications to modify values in some subscribers, such as presence indicators or authentication keys.

The key advantages of architecture 400 relative to architecture 300 is to decouple the administrative and the network domains. Specifically, applications no longer need to interact directly with profile database 122. As a result, applications can scale nearly independently of profile database 122 storage. Decisions on what to cache or not in the in-memory segment of the database is no longer required in the application, as all the pertinent data will be copied in data object repository 420 by the database federator 410. The application will have the opportunity to store interim results on a per subscriber basis in the interest of performance. With a complete decoupling, there is now the possibility of performing upgrades or recovery on the administrative database components with a complete shutdown of the administration domain without impacting the network applications.

When implementing a database architecture, such as architecture 400, a method for graceful redundancy degradation is needed in order to prevent data eviction from a distributed database built on a resource pool across many nodes. As shown in FIG. 4, distributed object repository 420 includes a multitude of nodes 430, each providing resources to the system, such as memory or disk space. Data is stored in a memory pool or in disk pools, and each piece of data is generally replicated on one or more nodes. The size of the database, such as profile database 122 can grow dynamically, as applications using the database can store more data than they delete from the database. In some circumstances, the pooled resources can be depleted due to usage growth, resulting in a database that has outgrown the size of the allocated pool of memory. This is particularly problematic with in-memory databases, since the same memory resource is used by other programs on the same computer, and a shortage of memory can lead to application failure.

A simple way to deal with this problem is to simply prevent the application from writing any more data to the database. As a consequence, the application may be forced to issue an error, throw an exception, and prevent the transaction from being processed. This has the negative effect of affecting the availability of the service being provided, essentially a denial of service.

Another way to deal with this problem is to age the information, and delete the older elements from the database as new ones are inserted. This method is common to caching databases, and has the unfortunate effect of deleting some potentially useful information that would in turn result in a denial of service.

Rather, a more sophisticated approach is needed to gracefully reduced the number of stored duplicates to avoid the problems described above. In other words a method is needed as to how the database may decrease its redundancy criteria in order to dynamically allow applications to store more data. The database can then prevent the system from running out of memory by relaxing the data redundancy criteria, and by using the freed memory from the deleted replica. With this invention, no valuable data is deleted, no service is affected, however the reliability of the system may be compromised in the event of a system failure, since some of the duplicates have been deleted.

As an example, assume that distributed object repository 420 has 4 nodes (N) 430 configured with the same amount of memory (M), and that database federator 410 is configured to store 4 replicates (R) of the same data from profile database 122. In such a system whenever new data is stored, a copy of the data is created in each of the 4 nodes. The total pool of memory available in such a system is 4M, and when configured with 4 replicates, the system can store a database of size $S=N*M/R=4*M/4=M$.

In the event that the database size (S) were to exceed the maximum size possible given the configuration, i.e. S>M, then the system would dynamically decrease the replication factor (R) to a smaller value. In this example, the system would reduce the value to R=3. At that time, the system would be able to store a database of size $S=4M/3=1.333M$, allowing the system to store more 33% more data into the database without deleting any unique piece of data (complete eviction), hence ensuring the availability of the database. At a later time, should S be exceeding the new maximum size, i.e. S>1.333M, then the system would further downgrade the replication factor to R=2. The maximum allowable size of the database would then be $S=4M/2=2M$, and as a result, would allow for additional data to be added to the database. Methods 500 and 600 described below provide various embodiments as to how such an approach to graceful redundancy degradation can be implemented.

In practice, there are two replication factors: target and actual. A target replication would generally be a whole number, i.e. 2, whereas the actual replication factor is measured by dividing the actual number of stored objects and replicates, and dividing by the number of unique (original) objects. In steady state, the target and actual replication factor should be same.

Figure 5:
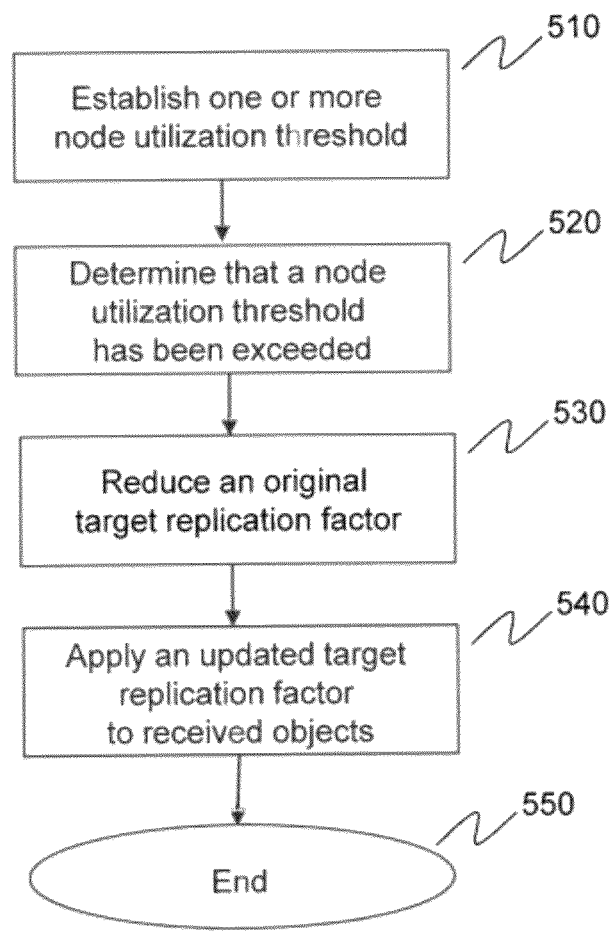
FIG. 5 provides a method for graceful redundancy degradation of stored duplicate objects with a set of nodes, according to an embodiment of the invention.

FIG. 5 provides a method 500 for graceful redundancy degradation of stored duplicate objects with a set of nodes, according to an embodiment of the invention. An object includes a set of data. In embodiments, the set of data includes data relating to the provisioning of a communications or Internet-based service, such as, for example data service profile data, billing data, session information, network usage data or any other type of data that may be stored in profile database 122, state database 124 or usage database 126. When an object is received, the received object and duplicate objects of the received object are stored in nodes, such as nodes 420. The number of duplicate objects stored is determined by a replication factor. In embodiments, multiple replication factors may exist based on the priority of received objects.

Method 500 begins in step 510. In step 510 a node utilization threshold is established. Node utilization refers to the capacity of the specific nodes that has been used to store data objects. For example, a node utilization threshold can be established for nodes 430.

In step 520 a determination is made whether the node utilization threshold has been exceeded. In embodiments, multiple target replication factors may exist based on the priority of received objects. In this scenario, when the node utilization threshold is exceeded a first target replication factor is applied to objects of a first priority and a second target replication factor is applied to objects of a second priority, for example. In an embodiment, the first priority is higher than the second priority and the first target replication factor is greater than the second target replication factor.

In step 530, a target replication factor based on the utilization threshold that has been exceeded is reduced. In an embodiment the target replication factor is reduced based on a current level of duplication. In an alternative embodiment, the target replication factor for an object is a function of a value within the object or a priority of an object. The value of the object may be based on one or more of business importance of the object or whether the object can be readily recreated.

In step 540 an updated target replication factor is applied to received objects. In step 550 method 500 ends. In embodiments, Method 500 also includes determining that an abatement threshold has been reached. When the abatement threshold is reached the target replication factor is reset to the original target replication factor or alternatively can be adjusted to some other value. The abatement threshold is set by assessing one or more of overall node capacity, rate of object retrieval, and rate of object deletion.

In another embodiment, a determination of the overall actual replication factor of objects stored across the nodes can be determined. When the actual replication factor drops below a certain threshold an alarm can be generated to indicate that objects are not being duplicated at a sufficient rate. The overall actual replication factor can also be determined on a per priority basis of objects stored across the nodes and selected alarms generated on a per priority basis.

Figure 6:
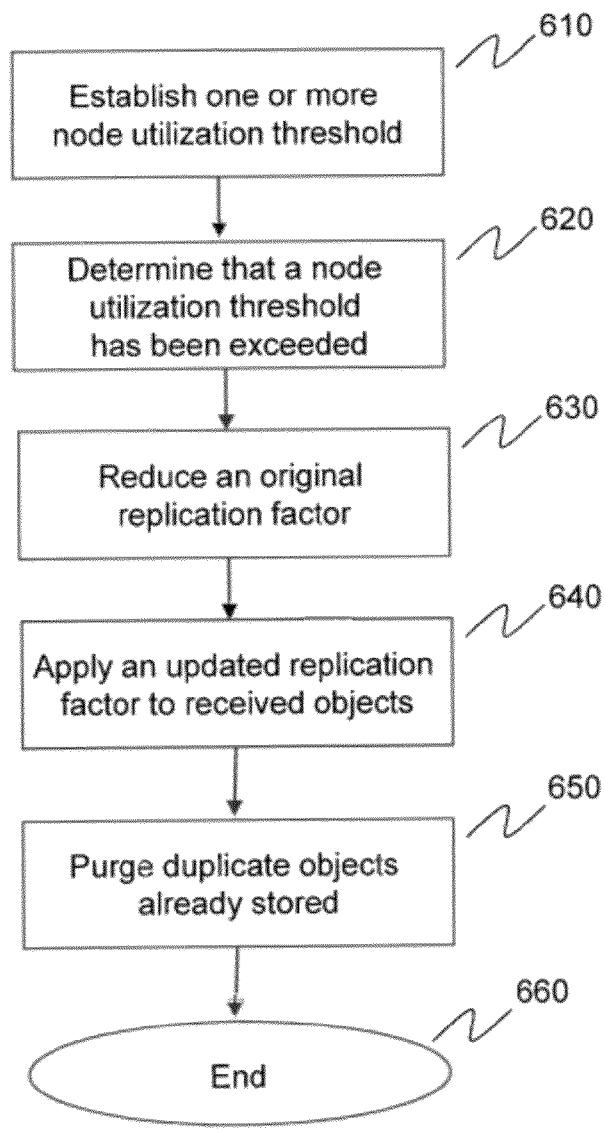
FIG. 6 provides a method for graceful redundancy degradation of stored duplicate objects within a set of nodes, according to an embodiment of the invention.

FIG. 6 provides a method 600 for graceful redundancy degradation of stored duplicate objects within a set of nodes, according to an embodiment of the invention. Method 600 is similar to method 500 with the difference being that in addition to reducing a target replication factor when a node utilization threshold is reached, stored duplicates are also purged based on the type of node utilization level that is reached.

Method 600 begins in step 610. In step 610 one or more node utilization thresholds is established.

In step 620 a determination is made whether one or more node utilization thresholds have been exceeded. In an embodiment, the one or more utilization thresholds include a first utilization threshold and a second utilization threshold. The first utilization threshold is less than the second utilization threshold. When the first utilization threshold is exceeded the target replication factor is reduced. When the second utilization factor is exceeded selected stored objects are purged.

In another embodiment, the one or more utilization thresholds include a first utilization threshold, a second utilization threshold and a third utilization threshold. In this case, the first utilization threshold is less than the second utilization threshold and the second utilization threshold is less than the third utilization threshold. When the first utilization threshold is exceeded the target replication factor is reduced to a factor greater than zero. When the second utilization factor is exceeded selected stored objects are purged, and when the third utilization factor is exceeded the replication factor is reduced to zero.

Additionally, in further embodiments, multiple replication factors may exist based on the priority of received objects. In this scenario, when a particular node utilization threshold is exceeded a first target replication factor is applied to objects of a first priority and a second target replication factor is applied to objects of a second priority, for example. In an embodiment, the first priority is higher than the second priority and the first replication factor is greater than the second priority. In another embodiment, multiple utilization thresholds exist such that when a first utilization threshold is exceeded, a target replication factor for objects less than a first priority can be reduced. When a second utilization threshold is exceeded, a target replication factor for objects with a second priority that is higher than the first priority can be reduced, and so on.

In step 630, one or more target replication factors based on the one or more utilization thresholds that have been exceeded are reduced. In an embodiment one or more target replication factors are reduced based on a current level of duplication. In an alternative embodiment, a target replication factor for an object is a function of a value within an object or the priority of an object. The value of the object may be based on one or more of business importance of the object or whether the object can be readily recreated.

In step 640 one or more updated target replication factors are applied to received objects.

In step 650 duplicate objects that are already stored are purged. In an embodiment, duplicate objects already stored are purged, such that the number of duplicates that are not purged for an object is based on the utilization threshold that has been exceeded. In an alternative embodiment, a stored duplicate object is purged when the number of stored duplicate objects for a particular object exceed the current target replication factor. Alternatively, stored duplicate objects can be purged when the number of stored duplicate objects for a particular object exceeds the current target replication factor on an as needed basis. In embodiments, upon restoration of a target replication factor, deleted replicates are recreated on an as-needed basis, or could be batched in a replication or rebalancing process across all nodes 430 within database architectures 400, for example.

In step 660 method 600 ends. In embodiments, Method 600 also includes determining that one or more abatement thresholds have been reached. When an abatement threshold is reached the replication factor is reset to the original target replication factor or some other value. In embodiments, abatement thresholds are set by assessing one or more of overall node capacity, rate of object retrieval, and rate of object deletion. In an embodiment, when an abatement threshold has been met duplicates are recreated. Before object duplicates are re-created en masse, the node utilization level (i.e. empty space, capacity) is assessed to ensure that there is sufficient capacity. One approach to making this assessment is to use the current actual replication factor, compare it to the target replication factor, and assess the size of the current utilization, extrapolate the capacity required for all duplicates, and confirm that node capacity is not exceeded. In an embodiment an oscillation filter also exists that would prevent poorly configured thresholds from causing oscillation between target replication factor values in steady state that leads from repeated deletion and recreation of duplicate objects.

In another embodiment, a determination of the overall actual replication factor of objects stored across the nodes can be determined. When the actual replication factor drops below a certain threshold an alarm can be generated to indicate that objects are not being duplicated at a sufficient rate. The overall actual replication factor can also be determined on a per priority basis of objects stored across the nodes and selected alarms generated on a per priority basis.

Another key challenge to successfully implement a distributed object repository based architecture, as depicted in FIG. 4 is how to manage the distributed nature of a database, where all objects are stored redundantly in a pseudo-random fashion (based, for example, on a consistent hashing algorithm) across multiple systems, and the invocation of time-based events.

Within a mobile communications network context, an example time-based event to be managed is the treatment of the expiry of a communications or service session. In an example, each session has an entry in a database, sessions are created pseudo-randomly (e.g., as subscribers launch applications, for example), and each session expires after 24 hours after their creation.

In current systems, the application manages the time-based events. The application keeps a table in the database or in memory with all the jobs (timers), recurring and non-recurring, and indexes them by expiry time. The application then runs batches on a regular interval to process these events, or may expire them in near real-time. This approach works well with a non-distributed system, as the master has access to all objects in the database, and is the only one responsible for managing them.

In a distributed system, such as depicted in FIG. 4 above, this approach is problematic, as the ownership concept of an object in a database is vague. Since any element may be accessed by any system in the grid of distributed repositories, and since the distributed repositories can grow substantially larger than any one server can manage, the responsibility for time-based event triggering must also be distributed.

One approach to accomplish this is to assign a primary application server to the task. An inherent problem with this solution is that it does not scale well, since once the capacity of the one master server is reached, more application servers need to be assigned. This solution also suffers from asymmetry, since not all servers share the load equally. Another method of achieving this is by distributing timer and job scheduling responsibilities between the application servers in an even fashion. This forces applications to collaborate on state information in order to provide redundancy, and prevents the application from functioning in a true data-less configuration.

Figure 7:
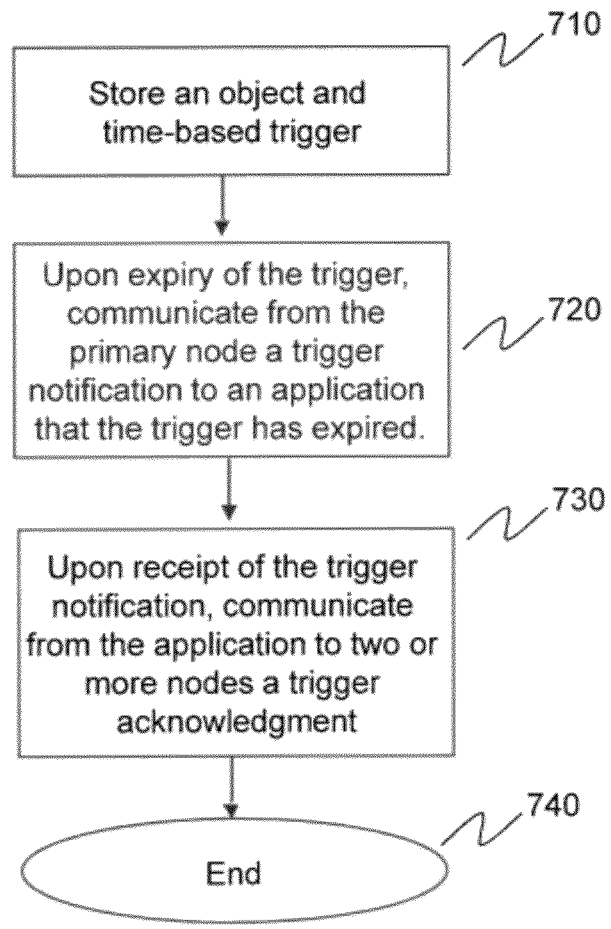
FIG. 7 provides a method for time-based triggering of duplicate objects stored in within separate nodes, according to an embodiment of the invention.
Figure 8:
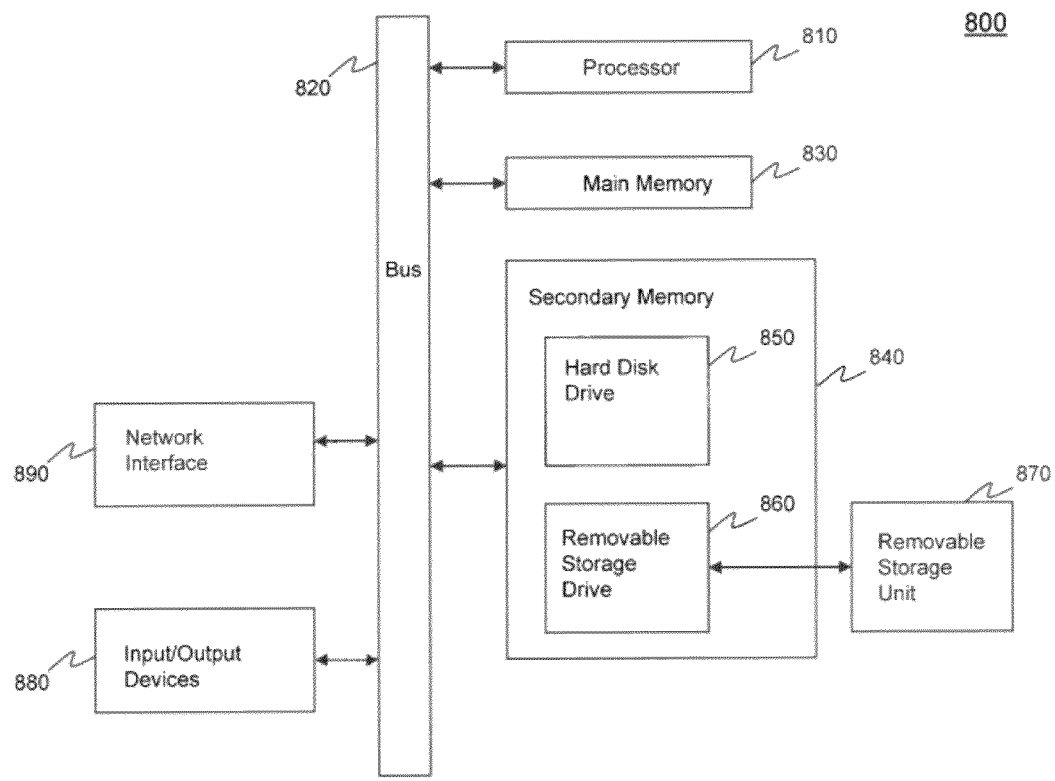
FIG. 8 is a diagram of a computer system on which the methods and systems herein described can be implemented, according to an embodiment of the invention.

FIG. 7 provides a method 700 for time-based triggering of duplicate objects stored within separate nodes, according to an embodiment of the invention. Method 700 provides an approach for a system, such as disclosed in FIG. 4, to store object time based triggers (e.g., behavior) along with the object, and distribute the responsibility of these triggers between the storage servers using, for example, a hashing algorithm on the primary key of that object, with a priority order.

In embodiments, method 700 also provides a policy-based priority scheme for specifying which application node will be the recipient of the trigger, which will in turn invoke the appropriate business logic within the application space. These triggers are also persistent (not necessarily to disk, but rather failure-tolerant), in as much as more than one server will trigger the event, based on availability and priority measurements, and the servers will wait for an acknowledgement from the application before marking the trigger as successful. Additionally, different servers will reattempt invoking the trigger to different application nodes at timed intervals until successful based on the policy scheme for a particular trigger.

With this approach, the responsibility of triggering events based on object or system timers is fully distributed among the data store server nodes, and the applications do not need to keep into consideration the state of their peer entities. This approach also offers redundancy both at the data store and at the application level.

Method 700 begins in step 710. In step 710, an object and an associated time-based trigger are stored in two or more nodes with one of the two or more nodes identified as the primary node for the object. In an embodiment, an approach for identifying a location of the application to be triggered is also stored. This approach can include, but is not limited to identifying a specific location of the application, determining a location of the application through a round robin analysis or specifying that the closest available location of the application should be used. In some situations the location of duplicate objects will be known to an application. In other situations the location of duplicate objects is calculated by the application. In other embodiments a secondary time-based trigger may be stored that transmits a trigger notification upon expiry of the trigger and after expiry of the grace period when a trigger acknowledgement is not received. In fact, n-levels of triggers may be stored, such that time-based trigger identified as being of the nth level of priority transmits a trigger notification upon expiry of the trigger and after "n–1" grace periods when a trigger acknowledgment is not received, where "n" is an integer.

In step 720 upon expiry of the associated time-based trigger. The primary node for the object communicates a trigger notification to an application that the trigger has expired. In an embodiment, the application and one or more instances of the application are stored in separate locations. The non-primary node or nodes do not communicate a trigger notification until after the expiry of at least one grace period. A grace period is a duration of time upon which the system waits to see if the primary node has sent a trigger notification, and trigger acknowledgment is received by the primary and non-primary nodes from an application.

In step 730 upon receipt of the trigger notification, the application communicates to the two or more nodes where the object is stored a trigger acknowledgment that the trigger has been received. Business logic is applied based on the trigger received within the application. In step 740, method 700 ends.

Computer System Implementation

Computer 700 includes one or more processors (also called central processing units, or CPUs), such as processor 810. Processor 810 is connected to communication bus 820. Computer 800 also includes a main or primary memory 830, preferably random access memory (RAM). Primary memory 830 has stored therein control logic (computer software), and data.

Computer 800 may also include one or more secondary storage devices 840. Secondary storage devices 840 include, for example, hard disk drive 850 and/or removable storage device or drive 860. Removable storage drive 860 represents a floppy disk drive, a magnetic tape drive, a compact disk drive, an optical storage device, tape backup, ZIP drive, JAZZ drive, etc.

Removable storage drive 860 interacts with removable storage unit 870. As will be appreciated, removable storage unit 860 includes a computer usable or readable storage medium having stored therein computer software (control logic) and/or data. Removable storage drive 860 reads from and/or writes to the removable storage unit 870 in a well known manner.

Removable storage unit 870, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 800, or multiple computer 800s to perform any combination of the functions described herein.

Computer programs (also called computer control logic) are stored in main memory 830 and/or the secondary storage devices 840. Such computer programs, when executed, direct computer 800 to perform the functions of the present invention as discussed herein. In particular, the computer programs, when executed, enable processor 810 to perform the functions of the present invention. Accordingly, such computer programs represent controllers of the computer 800.

Computer 800 also includes input/output/display devices 880, such as monitors, keyboards, pointing devices, etc.

Computer 800 further includes a communication or network interface 890. Network interface 890 enables computer 800 to communicate with remote devices. For example, network interface 890 allows computer 800 to communicate over communication networks, such as LANs, WANs, the Internet, etc. Network interface 890 may interface with remote sites or networks via wired or wireless connections. Computer 800 receives data and/or computer programs via network interface 890.

The invention can work with software, hardware, and operating system implementations other than those described herein. Any software, hardware, and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A method comprising:
   establishing, utilizing a processor, at least one node utilization threshold for a plurality of nodes storing objects;
   on determining that a first utilization threshold of the at least one node utilization threshold has been exceeded by a utilization of the nodes; and
   in response to the determination that the first utilization threshold of the at least one node utilization threshold has been exceeded, reducing an original value of a replication factor to an updated value that is greater than zero;
   storing a received one of the objects and at least one duplicate object that is a copy of the received object, wherein a number of the at least one duplicate object stored is determined by the updated value of the replication factor, wherein the received object and the at least one duplicate object are stored on separate nodes;
   increasing the updated value of the replication factor to perform object replication by:
      storing an abatement threshold, wherein the abatement threshold is configured based on an assessment of: a capacity of the nodes, a rate of retrieval of the objects from the nodes, and a rate of deletion of the objects from the nodes,
      determining that the abatement threshold has been met,
      in response to the determination that the abatement threshold has been met, assessing the utilization of the nodes to determine that the capacity of the nodes is sufficient to increase the updated value of the replication factor, and
      increasing the updated value of the replication factor based on the determination that the capacity of the nodes is sufficient to increase the updated value of the replication factor;
   on determining that a second utilization threshold is exceeded, purging one or more of the objects; and
   on determining that a third utilization threshold is exceeded, reducing the value of the replication factor to zero such that the object replication is prevented;
   wherein the first utilization threshold is less than the second utilization threshold and the second utilization threshold is less than the third utilization threshold.

2. The method of claim 1, further comprising purging duplicate objects already stored, wherein a number of duplicate objects that are not purged for an object is based on the first utilization threshold that has been exceeded.

3. The method of claim 1, further comprising reducing the updated value of the replication factor based on a value of an object.

4. The method of claim 1, wherein the value of the object is based on one or more of a business importance of the object and whether the object can be recreated.

5. The method of claim 1, further comprising purging a stored duplicate object on determining a number of stored duplicate objects for a particular object exceed the updated value of the replication factor.

6. The method of claim 1, further comprising purging a stored duplicate object on determining a number of stored duplicate objects for a particular object exceed the updated value of the replication factor on an as needed basis.

7. The method of claim 1, wherein an object comprises a set of data.

8. The method of claim 1, wherein an object comprises a set of data that relates to provisioning of a communications service.

9. The method of claim 8, wherein an object includes at least one of service profile data, subscriber profile data, billing data, session information, and network usage data.

10. The method of claim 1, wherein increasing the updated value of the replication factor based on the determination that the capacity of the nodes is sufficient to increase the updated value of the replication factor includes resetting the updated value of the replication factor to the original value of the replication factor.

11. The method of claim 1, wherein multiple replication factors exist based on a priority of received objects.

12. The method of claim 11, wherein upon one of the node utilization thresholds being exceeded a first replication factor is applied to objects of a first priority and a second replication factor is applied to objects of a second priority, wherein the first priority is higher than the second priority and the first replication factor is greater than the second priority.

13. The method of claim 1, further comprising determining an overall replication factor of objects stored across the nodes.

14. The method of claim 13, further comprising generating an alarm on determining the overall replication factor drops below a threshold.

15. The method of claim 1, further comprising determining an overall replication factor on a per priority basis of objects stored across the nodes.

* * * * *